United States Patent
Jia et al.

(10) Patent No.: US 11,025,344 B2
(45) Date of Patent: Jun. 1, 2021

(54) FIBER COMMUNICATION SYSTEMS AND METHODS

(71) Applicant: CABLE TELEVISION LABORATORIES, INC, Louisville, CO (US)

(72) Inventors: Zhensheng Jia, Superior, CO (US); Luis Alberto Campos, Superior, CO (US); Curtis Dean Knittle, Superior, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 255 days.

(21) Appl. No.: 16/093,594

(22) PCT Filed: Mar. 21, 2017

(86) PCT No.: PCT/US2017/023355
§ 371 (c)(1),
(2) Date: Oct. 12, 2018

(87) PCT Pub. No.: WO2017/213729
PCT Pub. Date: Dec. 14, 2017

(65) Prior Publication Data
US 2020/0328817 A1    Oct. 15, 2020

Related U.S. Application Data

(63) Continuation-in-part of application No. 15/283,632, filed on Oct. 3, 2016, now Pat. No. 9,912,409.
(Continued)

(51) Int. Cl.
*H04B 10/00* (2013.01)
*H04B 10/50* (2013.01)
*H04B 10/64* (2013.01)
*H04B 10/532* (2013.01)
*H04B 10/63* (2013.01)
(Continued)

(52) U.S. Cl.
CPC ......... *H04B 10/504* (2013.01); *H04B 10/502* (2013.01); *H04B 10/505* (2013.01); *H04B 10/506* (2013.01); *H04B 10/532* (2013.01); *H04B 10/63* (2013.01); *H04B 10/64* (2013.01); *H04J 14/04* (2013.01); *H04J 14/06* (2013.01)

(58) Field of Classification Search
CPC combination set(s) only.
See application file for complete search history.

(56) References Cited

U.S. PATENT DOCUMENTS 4,635,246 A * 1/1987 Taylor .................. H01S 5/4006
372/18
7,386,235 B2 * 6/2008 Jennen ................ H04J 14/0226
398/170

(Continued)

*Primary Examiner* — Agustin Bello
(74) *Attorney, Agent, or Firm* — Armstrong Teasdale LLP

(57) ABSTRACT

An injection locked transmitter for an optical communication network includes a master seed laser source input substantially confined to a single longitudinal mode, an input data stream, and a laser injected modulator including at least one slave laser having a resonator frequency that is injection locked to a frequency of the single longitudinal mode of the master seed laser source. The laser injected modulator is configured to receive the master seed laser source input and the input data stream, and output a laser modulated data stream.

20 Claims, 9 Drawing Sheets

Related U.S. Application Data

(60) Provisional application No. 62/321,211, filed on Apr. 12, 2016.

(51) Int. Cl.
*H04J 14/04* (2006.01)
*H04J 14/06* (2006.01)

(56) References Cited

U.S. PATENT DOCUMENTS

| | | | | |
|---|---|---|---|---|
| 7,630,638 B2* | 12/2009 | Brolin | | H04J 14/0226 398/66 |
| 9,654,219 B2* | 5/2017 | Li | | H04B 10/616 |
| 9,705,599 B2* | 7/2017 | Dangui | | H04B 10/43 |
| 10,880,013 B2* | 12/2020 | Campos | | H04B 10/64 |
| 10,892,829 B2* | 1/2021 | Jia | | H04B 10/27 |
| 2003/0002099 A1* | 1/2003 | Sayyah | | H04B 10/60 398/79 |
| 2005/0123298 A1* | 6/2005 | Kim | | H04B 10/2587 398/70 |
| 2006/0210271 A1* | 9/2006 | Mori | | H04J 14/0282 398/71 |
| 2007/0064748 A1* | 3/2007 | Mirov | | H01S 3/2383 372/20 |
| 2008/0279230 A1* | 11/2008 | Dagenais | | H01S 5/06255 372/20 |
| 2009/0324230 A1* | 12/2009 | Kashima | | H04B 10/50 398/79 |
| 2010/0158512 A1* | 6/2010 | Chang | | H04J 14/0289 398/7 |
| 2011/0122912 A1* | 5/2011 | Benjamin | | H01S 5/4006 372/50.124 |
| 2011/0150502 A1* | 6/2011 | Zhao | | H01S 5/065 398/188 |
| 2012/0087666 A1* | 4/2012 | Kwon | | H04J 14/0221 398/79 |
| 2012/0251129 A1* | 10/2012 | Delfyett | | H04B 10/505 398/188 |
| 2014/0314368 A1* | 10/2014 | Chien | | H04B 10/532 385/11 |
| 2015/0098714 A1* | 4/2015 | Hatae | | H04B 10/6164 398/208 |
| 2015/0249504 A1* | 9/2015 | Slavik | | H04B 10/504 398/183 |
| 2017/0294966 A1* | 10/2017 | Jia | | H04B 10/504 |
| 2019/0245622 A1* | 8/2019 | Campos | | H04J 14/06 |
| 2019/0245623 A1* | 8/2019 | Campos | | H04B 10/504 |
| 2019/0268074 A1* | 8/2019 | Jia | | H04B 10/505 |
| 2019/0326995 A1* | 10/2019 | Zhou | | H04B 10/64 |
| 2019/0393974 A1* | 12/2019 | Xu | | H04B 10/65 |
| 2020/0119813 A1* | 4/2020 | Zhang | | H04B 10/532 |
| 2020/0336211 A1* | 10/2020 | Zhang | | H04B 10/541 |

* cited by examiner

FIBER COMMUNICATION SYSTEMS AND METHODS

CROSS REFERENCE TO RELATED APPLICATIONS

This application is a National Stage Entry of PCT/US17/23355, filed on Mar. 21, 2017, which claims the benefit of and priority to U.S. patent application Ser. No. 15/283,632 filed Oct. 3, 2016, now U.S. Pat. No. 9,912,409, issued Mar. 6, 2018. U.S. patent application Ser. No. 15/283,632 claims the benefit of and priority to U.S. Provisional Patent Application Ser. No. 62/321,211, filed Apr. 12, 2016. The respective disclosures of all of these prior applications are incorporated herein by reference in their entireties.

BACKGROUND

The field of the disclosure relates generally to fiber communication networks, and more particularly, to optical networks utilizing wavelength division multiplexing.

Telecommunications networks include an access network through which end user subscribers connect to a service provider. Bandwidth requirements for delivering high-speed data and video services through the access network are rapidly increasing to meet growing consumer demands. At present, data delivery over the access network is growing by gigabits(Gb)/second for residential subscribers, and by multi-Gb/s for business subscribers. Present access networks are based on passive optical network (PON) access technologies, which have become the dominant system architecture to meet the growing high capacity demand from end users.

Gigabit PON and Ethernet PON architectures are conventionally known, and presently provide about 2.5 Gb/s data rates for downstream transmission and 1.25 Gb/s for upstream transmission (half of the downstream rate). 10 Gb/s PON (XG-PON or IEEE 10G-EPON) has begun to be implemented for high-bandwidth applications, and a 40 Gb/s PON scheme, which is based on time and wavelength division multiplexing (TWDM and WDM) has recently been standardized. A growing need therefore exists to develop higher/faster data rates per-subscriber to meet future bandwidth demand, and also increase the coverage for services and applications, but while also minimizing the capital and operational expenditures necessary to deliver higher capacity and performance access networks.

One known solution to increase the capacity of a PON is the use of WDM technology to send a dedicated wavelength signal to end users. Current detection scheme WDM technology, however, is limited by its low receiver sensitivity, and also by the few options available to upgrade and scale the technology, particularly with regard to use in conjunction with the lower-quality legacy fiber environment. The legacy fiber environment requires operators to squeeze more capacity out of the existing fiber infrastructure to avoid costs associated with having to retrench new fiber installment. Conventional access networks typically include six fibers per node, servicing as many as 500 end users, such as home subscribers. Conventional nodes cannot be split further and do not typically contain spare (unused) fibers, and thus there is a need to utilize the limited fiber availability in a more efficient and cost-effective manner.

Coherent technology has been proposed as one solution to increase both receiver sensitivity and overall capacity for WDM-PON optical access networks, in both brown and green field deployments. Coherent technology offers superior receiver sensitivity and extended power budget, and high frequency selectivity that provides closely-spaced dense or ultra-dense WDM without the need for narrow band optical filters. Moreover, a multi-dimensional recovered signal experienced by coherent technology provides additional benefits to compensate for linear transmission impairments such as chromatic dispersion (CD) and polarization-mode dispersion (PMD), and to efficiently utilize spectral resources to benefit future network upgrades through the use of multi-level advanced modulation formats. Long distance transmission using coherent technology, however, requires elaborate post-processing, including signal equalizations and carrier recovery, to adjust for impairments experienced along the transmission pathway, thereby presenting significant challenges by significantly increasing system complexity.

Coherent technology in longhaul optical systems typically requires significant use of high quality discrete photonic and electronic components, such as digital-to-analog converters (DAC), analog-to-digital converters (ADC), and digital signal processing (DSP) circuitry such as an application-specific integrated circuit (ASIC) utilizing CMOS technology, to compensate for noise, frequency drift, and other factors affecting the transmitted channel signals over the long distance optical transmission. Coherent pluggable modules for metro solution have gone through C Form-factor pluggable (CFP) to CFP2 and future CFP4 via multi-source agreement (MSA) standardization to reduce their footprint, to lower costs, and also to lower power dissipation. However, these modules still require significant engineering complexity, expense, size, and power to operate, and therefore have not been efficient or practical to implement in access applications.

BRIEF SUMMARY

In one aspect, an injection locked transmitter for an optical communication network includes a master seed laser source input substantially confined to a single longitudinal mode, an input data stream, and a laser injected modulator including at least one slave laser having a resonator frequency that is injection locked to a frequency of the single longitudinal mode of the master seed laser source. The laser injected modulator is configured to receive the master seed laser source input and the input data stream, and output a laser modulated data stream.

In another aspect, an optical network communication system includes, an input signal source, an optical frequency comb generator configured to receive the input signal source and output a plurality of phase synchronized coherent tone pairs. Each of the plurality of phase synchronized coherent tone pairs includes a first unmodulated signal and a second unmodulated signal. The system further include a first transmitter configured to receive the first unmodulated signal of a selected one of the plurality of phase synchronized coherent tone pairs as a seed source and to output a first modulated data stream, and a first receiver configured to receive the first modulated data stream from the first transmitter and receive the second unmodulated signal of the selected one of the plurality of phase synchronized coherent tone pairs as a local oscillator source.

In yet another aspect, an optical network communication system includes an optical hub including an optical frequency comb generator configured to output at least one phase synchronized coherent tone pair having a first unmodulated signal and a second unmodulated signal, and a downstream transmitter configured to receive the first unmodulated signal as a seed source and to output a downstream modulated data stream. The system further includes a fiber node and an end user including a downstream receiver configured to receive the downstream modulated data stream from the downstream transmitter and receive the second unmodulated signal as a local oscillator source.

In a still further aspect, a method of optical network processing includes steps of generating at least one pair of first and second unmodulated phase synchronized coherent tones, transmitting the first unmodulated phase synchronized coherent tone to a first transmitter as a seed signal, adhering downstream data, in the first transmitter, to the first unmodulated phase synchronized coherent tone to generate a first modulated data stream signal, optically multiplexing the first modulated data stream signal and the second unmodulated phase synchronized coherent tone together within a hub optical multiplexer, and communicating the multiplexed first modulated data stream signal and the second unmodulated phase synchronized coherent tone to a first receiver, by way of fiber optics, for downstream heterodyne detection.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

Figure 1:
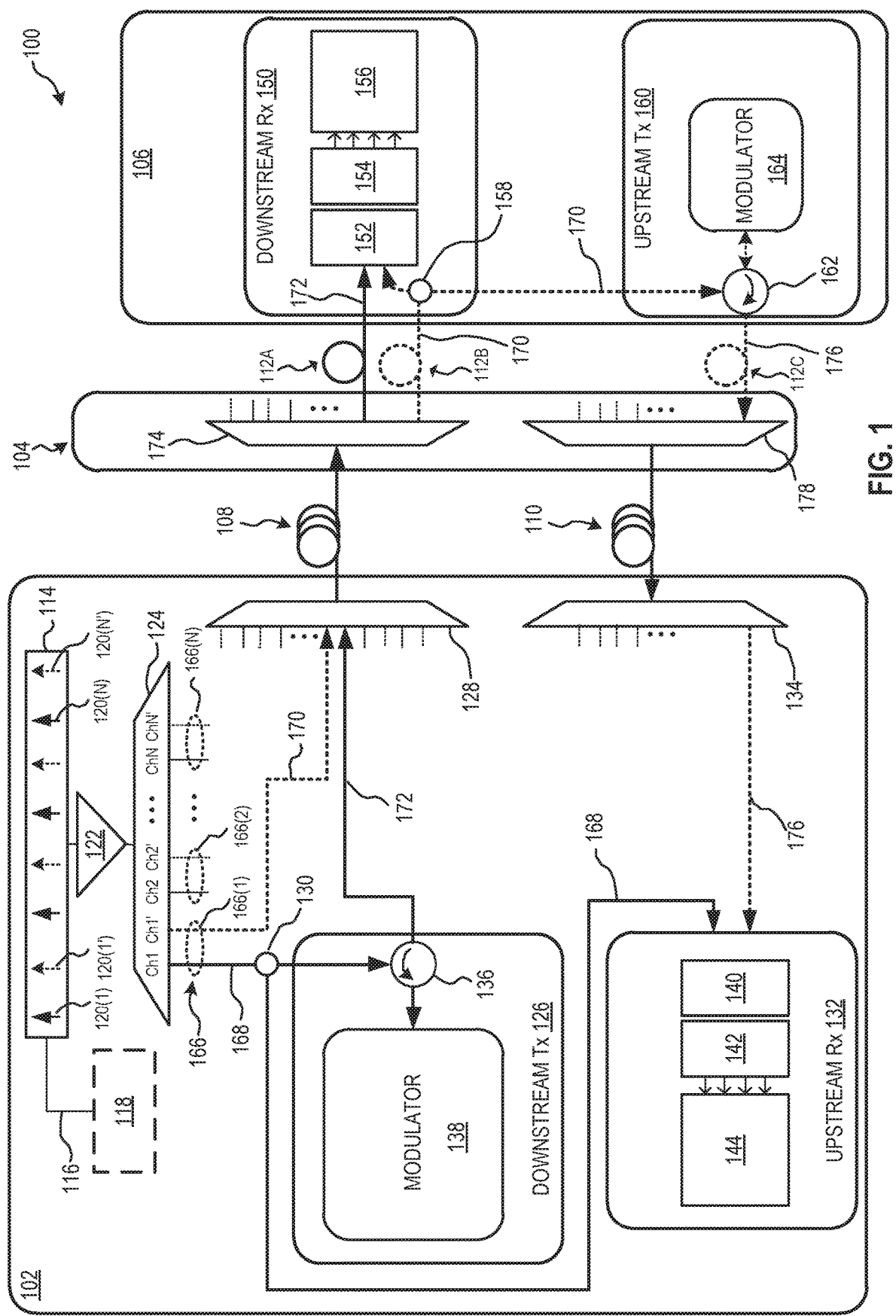
FIG. 1 is a schematic illustration of an exemplary fiber communication system in accordance with an exemplary embodiment of the present disclosure.

FIG. 1 is a schematic illustration of an exemplary fiber communication system 100 in accordance with an exemplary embodiment of the present disclosure. System 100 includes an optical hub 102, a fiber node 104, and an end user 106. Optical hub 102 is, for example, a central office, a communications hub, or an optical line terminal (OLT). In the embodiment shown, fiber node 104 is illustrated for use with a passive optical network (PON). End user 106 is a downstream termination unit, which can represent, for example, a customer device, customer premises (e.g., an apartment building), a business user, or an optical network unit (ONU). In an exemplary embodiment, system 100 utilizes a coherent Dense Wavelength Division Multiplexing (DWDM) PON architecture.

Optical hub 102 communicates with fiber node 104 by way of downstream fiber 108. Optionally, where upstream communication is desired along system 100, optical hub 102 further connects with fiber node 104 by way of upstream fiber 110. In operation, downstream fiber 108 and upstream fiber 110 are typically 30 km or shorter. However, according to the embodiments presented herein, greater lengths are contemplated, such as between 100 km and 1000 km. In an exemplary embodiment, fiber node 104 connects with end user 106 by way of fiber optics 112. Alternatively, fiber node 104 and end user 106 may be integrated as a single device, such as a virtualized cable modem termination system (vCMTS), which may be located at a customer premises. Where fiber node 104 and end user 106 are separate devices, fiber optics 112 typically spans a distance of approximately 5000 feet or less.

Optical hub 102 includes an optical frequency comb generator 114, which is configured to receive a high quality source signal 116 from an external laser 118 and thereby generate multiple coherent tones 120(1), 120(1'), ... 120(N), 120(N'). Optical frequency comb generator 114 utilizes, for example, a mode-locked laser, a gain-switched laser, or electro-optic modulation, and is constructed such that multiple coherent tones 120 are generated as simultaneous low-linewidth wavelength channels of known and controllable spacing. This advantageous aspect of the upstream input signal into system 100 allows a simplified architecture throughout the entire downstream portion of system 100, as described further below.

Generated coherent tones 120 are fed into an amplifier 122, and the amplified signal therefrom is input into a first hub optical demultiplexer 124. In an exemplary embodiment, amplifier 122 is an erbium-doped fiber amplifier (EDFA). Optical hub 102 further includes a downstream transmitter 126 and a hub optical multiplexer 128. In an embodiment, optical hub 102 optionally includes a hub optical splitter 130, an upstream receiver 132, and a second hub optical demultiplexer 134.

Downstream transmitter 126 includes a downstream optical circulator 136 and a downstream modulator 138. In an exemplary embodiment, downstream modulator 138 is an injection locked laser modulator. Upstream receiver 132 includes an upstream integrated coherent receiver (ICR) 140, an upstream analog to digital converter (ADC) 142, and an upstream digital signal processor (DSP) 144. In the exemplary embodiment, fiber node 104 includes a node optical demultiplexer 146. In an alternative embodiment, where upstream transmission is desired, fiber node 104 further includes a node optical multiplexer 148. In the exemplary embodiment, node optical demultiplexer 146 and node optical multiplexer 148 are passive devices.

End user 106 further includes a downstream receiver 150. In an exemplary embodiment, downstream receiver 150 has a similar architecture to upstream receiver 132, and includes a downstream ICR 152, a downstream ADC 154, and a downstream DSP 156. For upstream transmission, end user 106 optionally includes end user optical splitter 158, which may be located within downstream receiver 150 or separately, and an upstream transmitter 160. In an exemplary embodiment, upstream transmitter 160 has a similar architecture to downstream transmitter 126, and includes an upstream optical circulator 162, and an upstream modulator 164.

In operation, system 100 utilizes optical frequency comb generator 114 and amplifier 122 convert the input high quality source signal 116 into multiple coherent tones 120 (e.g., 32 tones, 64 tones, etc.), which are then input to first hub optical demultiplexer 124. In an exemplary embodiment, high quality source signal 116 is of sufficient amplitude and a narrow bandwidth such that a selected longitudinal mode of signal 116 is transmitted into optical frequency comb generator 114 without adjacent longitudinal modes, which are suppressed prior to processing by comb generator 114. First hub optical demultiplexer 124 then outputs a plurality of phase synchronized coherent tone pairs 166(1), 166(2), . . . 166(N). That is, the generated coherent frequency tones 120 are amplified by amplifier 122 to enhance optical power, and then demultiplexed into multiple separate individual phased synchronized coherent tone source pairs 166. For simplicity of discussion, the following description pertains only to coherent tone pair 166(1) corresponding to the synchronized pair signal for the first channel output, which includes a first unmodulated signal 168 for Ch1 and a second unmodulated signal 170 for Ch1', and their routing through system 100.

With source signal 116 of a high quality, narrow band, and substantially within a single longitudinal mode, coherent tone pair 166(1), including first unmodulated signal 168 (Ch1) and second unmodulated signal 170 (Ch1'), is output as a high quality, narrowband signal, which then serves as both a source of seed and local oscillator (LO) signals for both downstream and upstream transmission and reception directions of system 100. That is, by an exemplary configuration, the architecture of optical frequency comb generator 114 advantageously produces high quality continuous wave (CW) signals. Specifically, first unmodulated signal 168 (Ch1) may function as a downstream seed and upstream LO throughout system 100, while second unmodulated signal 170 (Ch1') concurrently may function as an upstream seed and downstream LO for system 100.

According to the exemplary embodiment, within optical hub 102, first unmodulated signal 168 (Ch1) is divided by hub optical splitter 130 and is separately input to both downstream transmitter 126 and upstream receiver 132 as a "pure" signal, and i.e., substantially low amplitude, narrow bandwidth continuous wave does not include adhered data. First unmodulated signal 168 (Ch1) thus becomes a seed signal for downstream transmitter 126 and an LO signal for upstream receiver 132. In an exemplary embodiment, within downstream transmitter 126, first unmodulated signal 168 (Ch1) passes through downstream optical circulator 136 into downstream modulator 138, in which one or more laser diodes (not shown in FIG. 1, described below with respect to FIGS. 2-5) are excited, and adhere data (also not shown in FIG. 1, described below with respect to FIGS. 2-5) to the signal that then exits downstream optical circulator 136 as downstream modulated data stream 172 (Ch1).

In an exemplary embodiment, downstream optical circulator 136 is within downstream transmitter 126. Alternatively, downstream optical circulator 136 may be physically located separately from downstream transmitter 126, or else within the confines of downstream modulator 138. Downstream modulated data stream 172 (Ch1) is then combined in hub optical multiplexer 128 with the plurality of modulated/unmodulated data stream pairs from other channels (not shown) and transmitted over downstream fiber 108, to a node optical demultiplexer 174 in fiber node 104, which then separates the different channel stream pairs for transmission to different respective end users 106. At end user 106, because the data stream pair 170, 172 entering downstream receiver 150 is a phase synchronized, digital signal processing at downstream DSP 156 is greatly simplified, as described below with respect to FIG. 7.

Where upstream reception is optionally sought at optical hub 102, second unmodulated signal 170 (Ch1') is divided, within end user 106, by end user optical splitter 158 and is separately input to both downstream receiver 150 and upstream transmitter 160 as a "pure" unmodulated signal for Ch1'. In this alternative embodiment, second unmodulated signal 170 (Ch1') thus functions a seed signal for upstream transmitter 160 and a "pseudo LO signal" for downstream receiver 150 for the coherent detection of Ch1. For purposes of this discussion, second unmodulated signal 170 (Ch1') is referred to as a "pseudo LO signal" because it uses an LO signal from a remote source (output from first hub optical demultiplexer 124), and is not required to produce an LO signal locally at end user 106. This particular configuration further significantly reduces cost and complexity of the architecture of the system 100 by the reduction of necessary electronic components.

For upstream transmission, in an exemplary embodiment, a similar coherent detection scheme is implemented for upstream transmitter 160 as is utilized for downstream transmitter 126. That is, second unmodulated signal 170 (Ch1') is input to upstream optical circulator 162 and modulated by upstream modulator 164 to adhere symmetric or asymmetric data (not shown, described below with respect to FIG. 6) utilizing one or more slave lasers (also not shown, described below with respect to FIG. 6), and then output as an upstream modulated data stream 176 (Ch1'), which is then combined with similar modulated data streams from other channels (not shown) by a node multiplexer 178 in fiber node 104. Second unmodulated signal 170 (Ch1') is then transmitted upstream over upstream fiber 110, separated from other channel signals by second hub optical demultiplexer 134, an input to upstream receiver 132, for simplified digital signal processing similar to the process described above with respect to downstream receiver 150.

By this exemplary configuration, multiple upstream channels from different end users 106 can be multiplexed at fiber node 104 (or a remote node) and sent back to optical hub 102. Thus, within optical hub 102, the same coherent detection scheme may be used at upstream receiver 132 as is used with downstream receiver 150, except that upstream receiver 132 utilizes first unmodulated signal 168 (Ch1) as the LO and upstream modulated data stream 176 (Ch1') to carry data, whereas downstream receiver 150 utilizes the data stream pair (Ch1, Ch1') in reverse. That is, downstream receiver 150 utilizes second unmodulated signal 170 (Ch1') as the LO and downstream modulated data stream 172 (Ch1) to carry data.

Implementation of the embodiments described herein are useful for migrating hybrid fiber-coaxial (HFC) architectures towards other types of fiber architectures, as well as deeper fiber architectures. Typical HFC architectures tend to have very few fiber strands available from fiber node to hub (e.g. fibers 108, 110), but many fiber strands could be deployed to cover the shorter distances that are typical from legacy HFC nodes to end users (e.g., fiber optics 112). In the exemplary embodiments described herein, two fibers (i.e., fibers 108, 110) are illustrated between optical hub 102 and fiber node 104, which can be a legacy HFC fiber node. That is, one fiber (i.e., downstream fiber 108) is utilized for downstream signal and upstream seed/downstream LO, and another fiber (i.e., upstream fiber 110) is utilized for upstream signal. Additionally, three fibers (i.e., fiber optics 112A-C) are illustrated for each end user from fiber node 104 (e.g., legacy HFC fiber node) to end user 106. By utilization of the advantageous configurations herein, fiber deeper or all-fiber migration schemes can utilize an HFC fiber node as an optical fiber distribution node, thereby greatly minimizing the need for fiber retrenching from an HFC node to an optical hub.

The architecture described herein, by avoiding the need for conventional compensation hardware, can therefore be structured as a significantly less expensive and more compact physical device than conventional devices. This novel and advantageous system and subsystem arrangement allows for multi-wavelength emission with simplicity, reliability, and low cost. Implementation of optical frequency comb generator 114, with high quality input source signal 116, further allows simultaneous control of multiple sources that are not realized by conventional discrete lasers. According to the embodiments herein, channel spacing, for example, may be 25 GHz, 12.5 GHz, or 6.25 GHz, based on available signal bandwidth occupancy.

The embodiments described herein realize still further advantages by utilizing a comb generator (i.e., optical frequency comb generator 114) that maintains a constant wavelength spacing, thereby avoiding optical beat interference (OBI) that may be prevalent in cases with simultaneous transmissions over a single fiber. In the exemplary embodiment illustrated in FIG. 1, fiber node 104 is shown as a passive system, and is thus expected to maintain a higher reliability than other migration approaches. Nevertheless, one of ordinary skill in the art, after reading and comprehending present application, will understand how the embodiments disclosed herein may also be adapted to a remote PHY solution, or to a remote cable modem termination system (CMTS) that is included in the fiber node.

As illustrated and described herein, system 100 may utilize an architecture of coherent DWDM-PON incorporate novel solutions to meet the unique requirements of access environment, but with cost-efficient structures not seen in conventional hardware systems. Optical frequency comb generator 114 produces a plurality of simultaneous narrow width wavelength channels with controlled spacing, thereby allowing simplified tuning of the entire wavelength comb. This centralized comb light source in optical hub 102 therefore provides master seeding sources and LO signals for both downstream and upstream directions in heterodyne detection configurations in order to reuse the optical sources throughout the entirety of system 100. This advantageous configuration realizes significant cost savings and reduction in hardware complexity over intradyne detection schemes in long-haul systems, for example.

Figure 2:
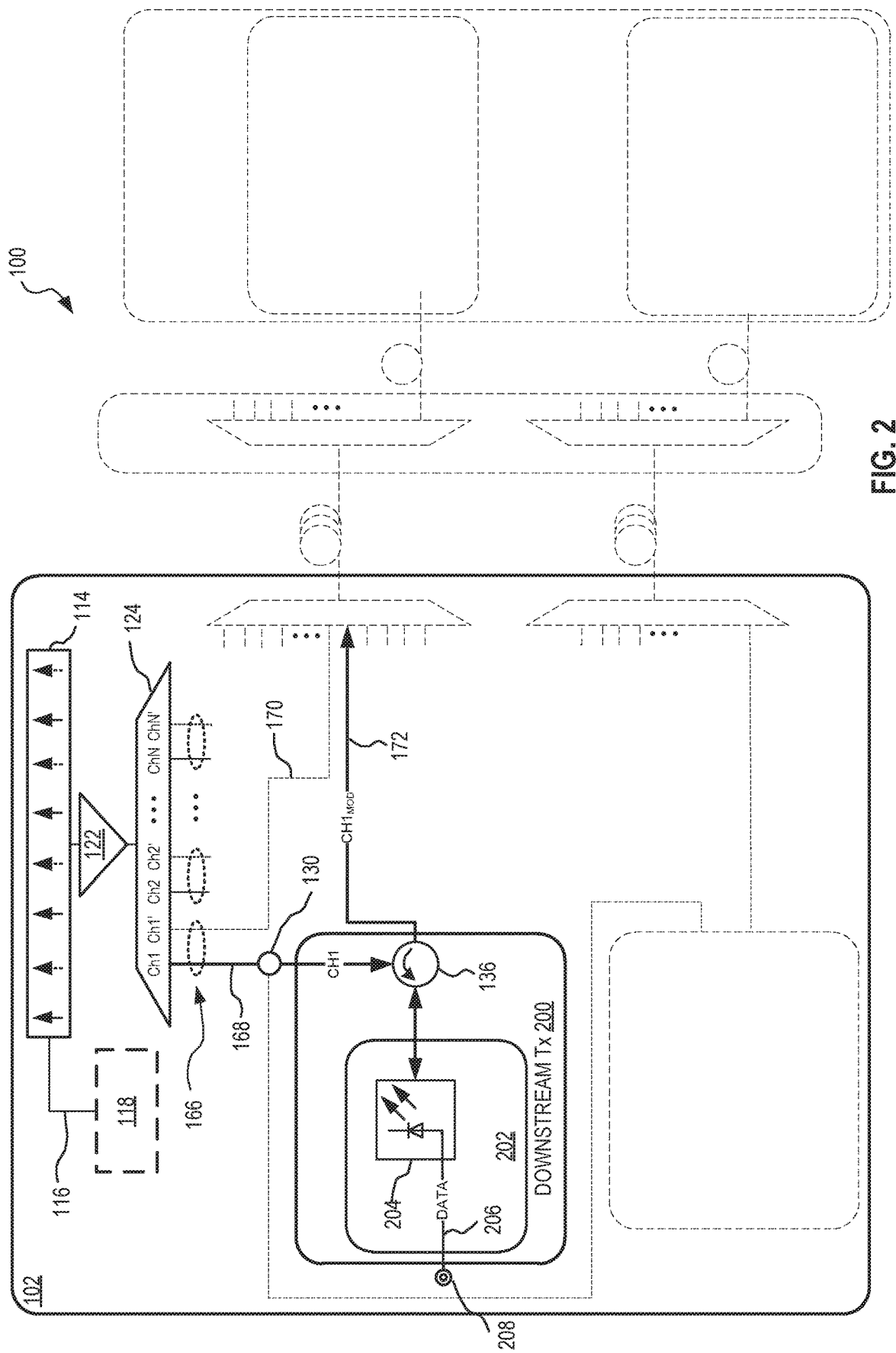
FIG. 2 is a schematic illustration depicting an exemplary transmitter that can be utilized with the fiber communication system depicted in FIG. 1.

FIG. 2 is a schematic illustration depicting an exemplary downstream transmitter 200 that can be utilized with fiber communication system 100, depicted in FIG. 1. Downstream transmitter 200 includes downstream optical circulator 136 (see FIG. 1, above) in two-way communication with a laser injected modulator 202, which includes a laser diode 204, which receives data 206 from an external data source 208. In an alternative embodiment, downstream transmitter 200 may include two separate fiber receivers (not shown), which would substitute, and eliminate the need, for downstream optical circulator 136 in the structural configuration shown.

In operation, downstream transmitter 200 performs the same general functions as downstream transmitter 126 (FIG. 1, described above). Laser injected modulator 202 utilizes laser diode 204 as a "slave laser." That is, laser diode 204 is injection locked by external laser 118, which functions as a single frequency or longitudinal mode master, or seed, laser to keep the frequency of a resonator mode of laser diode 204 close enough to the frequency of the master laser (i.e., laser 118) to allow for frequency locking. The principle of downstream transmitter 200 is also referred to as "laser cloning," where a single high quality master laser (i.e., laser 118) transmits a narrow bandwidth, low noise signal (i.e., source signal 116), and a relatively inexpensive slave laser (e.g., laser diode 204) can be used throughout system 100 to transmit data modulated signals, such as downstream modulated data stream 172 (Ch1). In an exemplary embodiment, laser diode 204 is a Fabry Perot laser diode (FP LD), or a vertical-cavity surface-emitting laser (VCSEL), in comparison with the considerably more expensive distributed feedback laser diodes (DFB LD) that are conventionally used. In an alternative embodiment, laser diode 204 is an LED, which can perform as a sufficient slave laser source according to the embodiments herein due to the utilization of the high quality source signal 116 that is consistently utilized throughout system 100.

More specifically, first unmodulated signal 168 (Ch1) exiting hub optical splitter 130 is input to downstream optical circulator 136, which then excites laser diode 204, that is, laser diode 204 emits light at a specified modulation rate. Laser injected modulator 202 adheres data 206 to the excited Ch1 signal, and the resultant modulated Ch1 signal with adhered data is output from downstream optical circulator 136 as downstream modulated data stream 172 (Ch1). According to this exemplary embodiment, first unmodulated signal 168 (Ch1) is input to downstream transmitter 126 as an unmodulated, low amplitude, narrow bandwidth, low noise "pure" source, and is modulated by laser diode 204, which is a high amplitude, wide bandwidth device, and resultant downstream modulated data stream 172 (Ch1) is a high amplitude, narrow bandwidth, low noise "pure" signal that can be transmitted throughout system 100 without the need for further conventional compensation means (hardware and programming). Suppression of adjacent longitudinal modes from laser diode 204, for example, is not necessary because of the exciting source signal (i.e., signal 168) is of such high quality and narrow bandwidth that output downstream modulated data stream 172 (Ch1) is substantially amplified only within the narrow bandwidth of external laser 118. In the exemplary embodiment illustrated in FIG. 2, laser injected modulator 202 implements direct modulation.

Optical injection locking as described herein thus improves upon the performance of the relatively less expensive, multi-longitudinal slave laser source (i.e., laser diode 204) in terms of spectral bandwidth and noise properties. With respect to heterodyne coherent detection, incoming signals (upstream or downstream) can be combined with the LO or pseudo-LO and brought to an intermediate frequency (IF) for electronic processing. According to this exemplary configuration, part of the LO/pseudo-LO optical power can also be employed as the master/seed laser for the reverse transmission direction, at both optical hub 102, and at end user 106 (described below with respect to FIG. 6), and thus a fully coherent system having a master seed and LO delivery from an optical hub can be achieved in a relatively cost-effective manner comparison with conventional systems.

Figure 3:
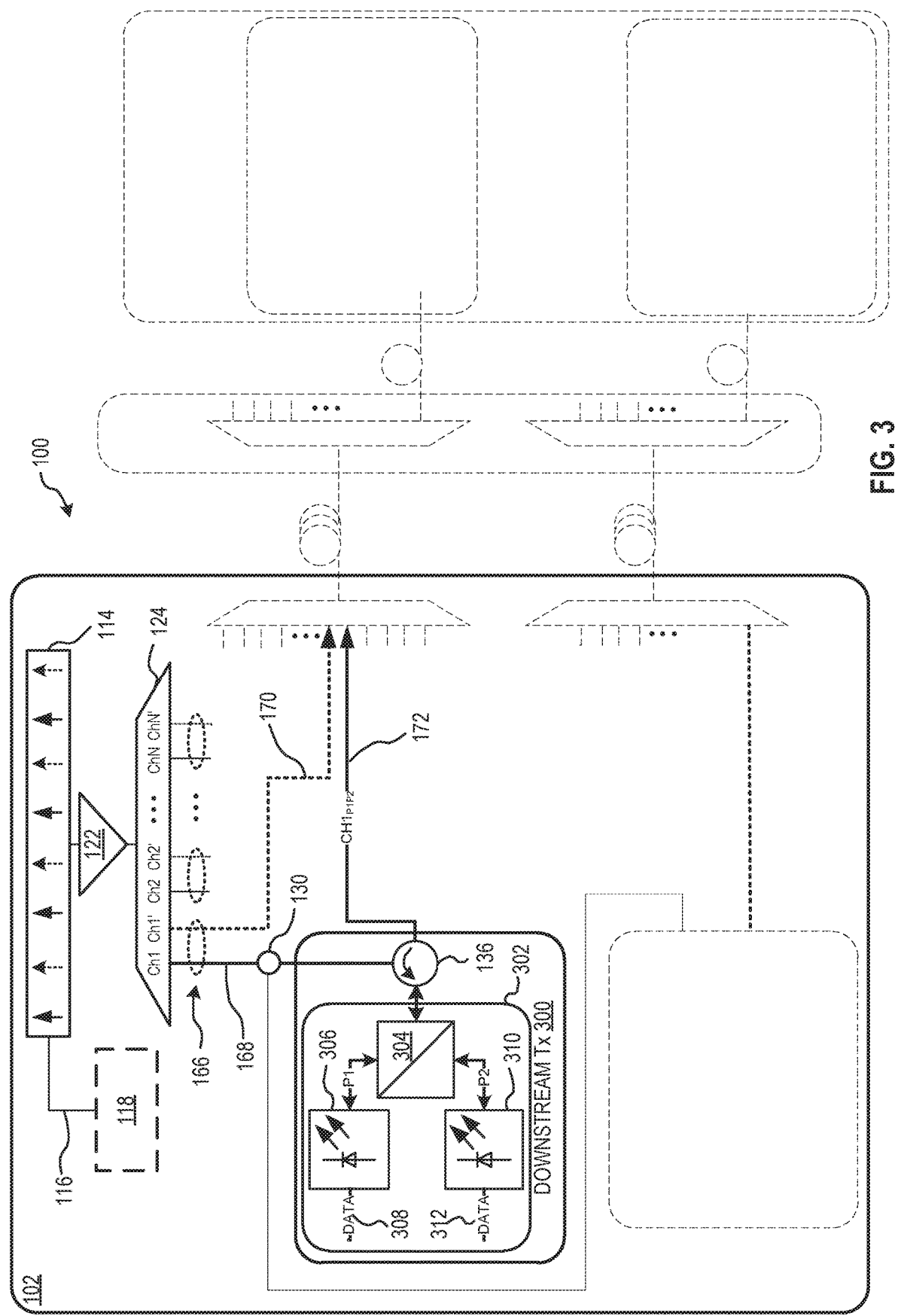
FIG. 3 is a schematic illustration depicting an alternative transmitter that can be utilized with the fiber communication system depicted in FIG. 1.

FIG. 3 is a schematic illustration depicting an alternative downstream transmitter 300 that can be utilized with fiber communication system 100, depicted in FIG. 1. Downstream transmitter 300 is similar to downstream transmitter 200 (FIG. 2), including the implementation of direct modulation, except that downstream transmitter 300 alternatively utilizes polarization division multiplexing to modulate the Ch1 signal into downstream modulated data stream 172 (Ch1).

Downstream transmitter 300 includes downstream optical circulator 136 (see FIG. 1, above) in two-way communication with a laser injected modulator 302, which includes a polarization beam splitter (PBS)/polarization beam combiner (PBC) 304, which can be a single device. Laser injected modulator 302 further includes a first laser diode 306 configured to receive first data 308 from an external data source (not shown in FIG. 3), and a second laser diode 310 configured to receive second data 312 from the same, or different, external data source.

In operation, downstream transmitter 300 is similar to downstream transmitter 200 with respect to the implementation of direct modulation, and master/slave laser injection locking. Downstream transmitter 300 though, alternatively implements dual-polarization from the splitter portion of PBS/PBC 304, which splits first unmodulated signal 168 (Ch1) into its x-polarization component P1 and y-polarization component P2, which separately excite first laser diode 306 and second laser diode 310, respectively. Similar to downstream transmitter 200 (FIG. 2), in downstream transmitter 300, first unmodulated signal 168 (Ch1) exiting hub optical splitter 130 is input to downstream optical circulator 136, the separate polarization components of which then excite laser diodes 306, 310, respectively, at the specified modulation rate. Laser injected modulator 302 adheres data first and second data 308, 312 to the respective excited polarization components of the Ch1 signal, which are combined by the combiner portion of PBS/PBC 304. The resultant modulated Ch1 signal with adhered data is output from downstream optical circulator 136 as downstream modulated data stream 172 (Ch1).

In an exemplary embodiment, the polarized light components received by first and second laser diodes 306, 310 are orthogonal (90 degrees and/or noninteractive). That is, first laser diode 306 and second laser diode 310 are optimized as slave lasers to lock onto the same wavelength as external laser 118 (master), but with perpendicular polarization directions. By this configuration, large data packets (e.g., first data 308 and second data 312) can be split and simultaneously sent along separate pathways before recombination as downstream modulated data stream 172 (Ch1). Alternatively, first data 308 and second data 312 may come from two (or more) separate unrelated sources. The orthogonal split prevents data interference between the polarized signal components. However, one of ordinary skill in the art will appreciate that, according to the embodiment of FIG. 3, first unmodulated signal 168 (Ch1) can also be polarized at 60 degrees, utilizing similar principles of amplitude and phase, as well as wavelength division. First unmodulated signal 168 (Ch1) can alternatively be multiplexed according to a spiral or vortex polarization, or orbital angular momentum. Additionally, whereas the illustrated embodiment features polarization multiplexing, space division multiplexing and mode division multiplexing may be also alternatively implemented.

According to this exemplary embodiment, master continuous wave signal for Ch1, namely, first unmodulated signal 168, is received from optical frequency comb generator 114 and is split to be used, in the first part, as the LO for upstream receiver 132, and in the second part, to synchronize two slave lasers (i.e., first laser diode 306 and second laser diode 310) by the respective x-polarization and y-polarization light portions such that both slave lasers oscillate according to the wavelength of the master laser (i.e., external laser 118). Data (i.e., first data 308 and second data 312) is directly modulated onto the two slave lasers, respectively. This injection locking technique thus further allows for frequency modulation (FM) noise spectrum control from the master laser to the slave laser, and is further able to realize significant improvements in FM noise/phase jitter suppression and emission linewidth reduction.

As described herein, utilization of optical injection with a dual-polarization optical transmitter (i.e., downstream transmitter 300) by direct modulation may advantageously implement relatively lower-cost lasers to perform the functions of conventional lasers that are considerably more costly. According to this configuration of a dual-polarization optical transmitter by direct modulation of semiconductor laser together with coherent detection, the present embodiments are particular useful for short-reach applications in terms of its lower cost and architectural compactness. Similar advantages may be realized for long reach applications.

Figure 4:
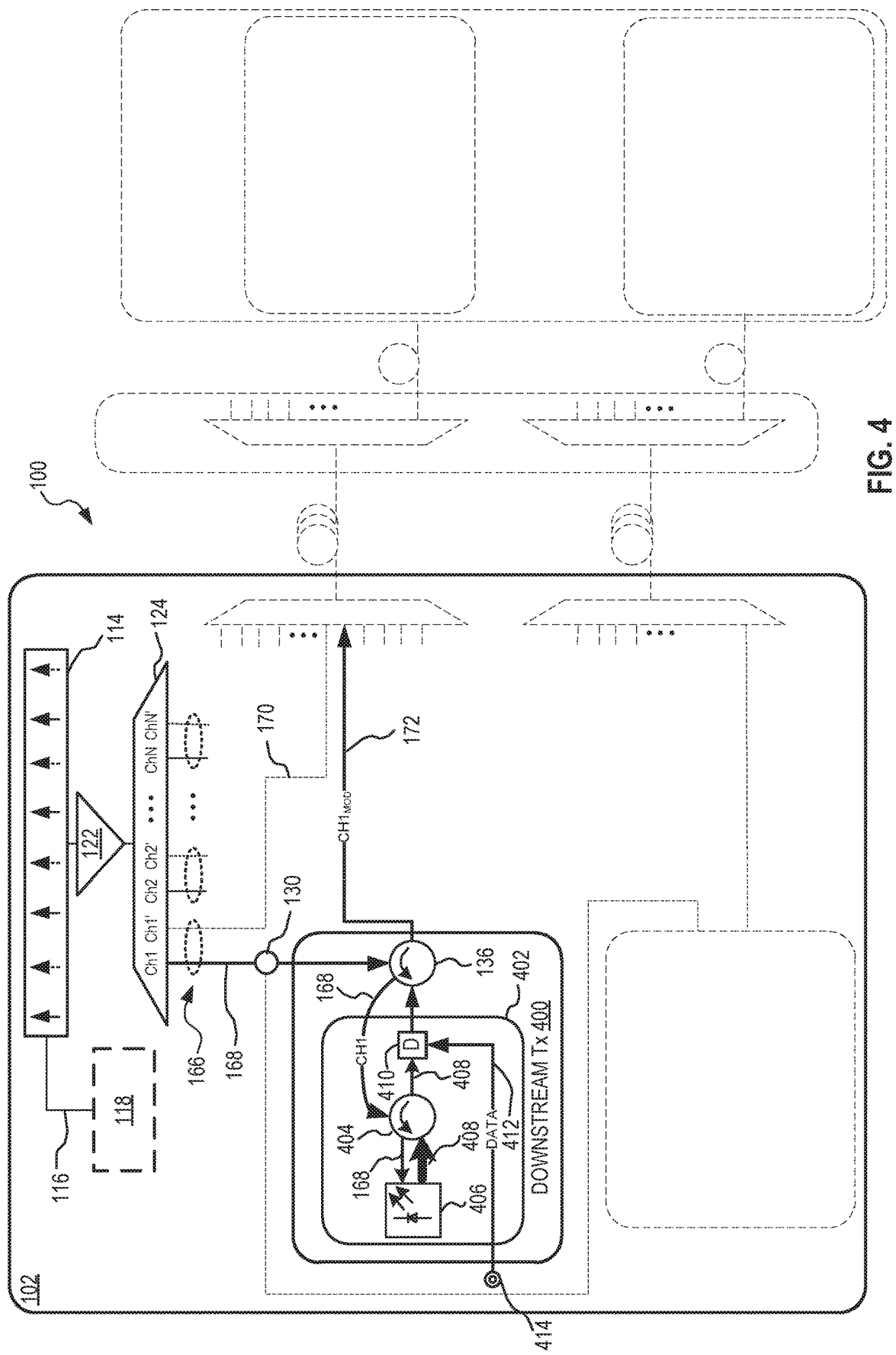
FIG. 4 is a schematic illustration depicting an alternative transmitter that can be utilized with the fiber communication system depicted in FIG. 1.

FIG. 4 is a schematic illustration depicting an alternative downstream transmitter 400 that can be utilized with fiber communication system 100, depicted in FIG. 1. Downstream transmitter 400 is similar to downstream transmitter 200 (FIG. 2), except that downstream transmitter 400 alternatively implements external modulation, as opposed to direct modulation, to modulate the Ch1 signal into downstream modulated data stream 172 (Ch1). Downstream transmitter 400 includes downstream optical circulator 136 (see FIG. 1, above) and a laser injected modulator 402. Downstream optical circulator 136 is in one-way direct communication with a separate external optical circulator 404 that may be contained within laser injected modulator 402 or separate. Laser injected modulator 402 further includes a laser diode 406, which receives the low amplitude, narrow bandwidth, first unmodulated signal 168 (Ch1) and emits an excited, high amplitude, narrow bandwidth, optical signal 408 back to external optical circulator 404.

Laser injected modulator 402 still further includes an external modulating element 410, which receives data 412 from an external data source 414, and adheres data 412 with optical signal 408 to be unidirectionally received back by downstream optical circulator 136 and output as downstream modulated data stream 172 (Ch1).

In this exemplary embodiment, downstream transmitter 400 performs the same general functions as downstream transmitter 126 (FIG. 1, described above), but uses external modulation as the injection locking mechanism to lock laser diode 406 to the wavelength of the master laser source (e.g., external laser 118). To implement external modulation, this embodiment regulates optical signal flow through mostly unidirectional optical circulators (i.e., downstream optical circulator 136, external optical circulator 404). External modulating element 410 may optionally include a demultiplexing filter (not shown) as an integral component, or separately along the signal path of downstream modulated data stream 172 (Ch1) prior to input by downstream receiver 150. In an exemplary embodiment, external modulating element 410 is a monitor photodiode, and injection locking is performed through a rear laser facet.

Figure 5:
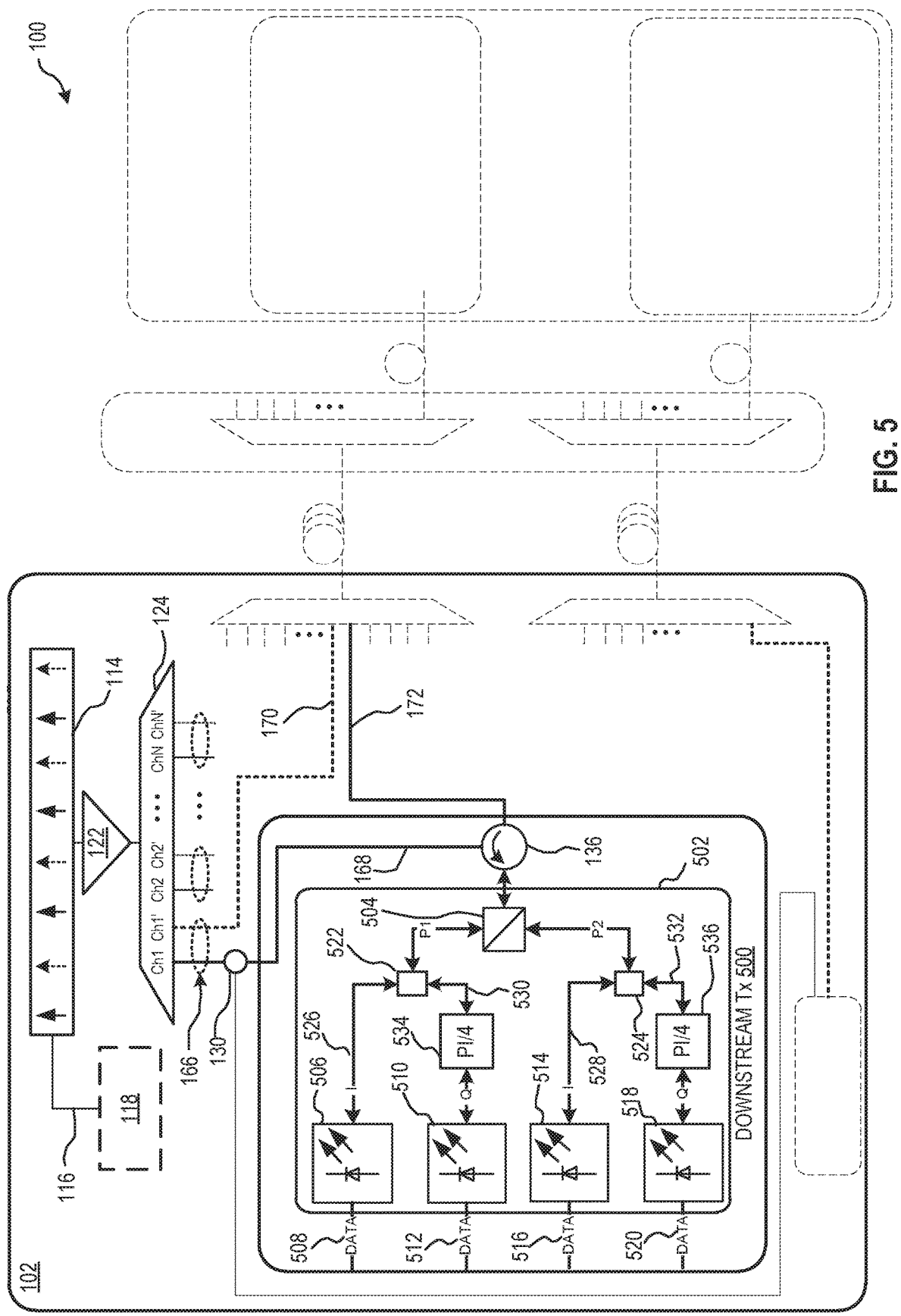
FIG. 5 is a schematic illustration depicting an alternative transmitter that can be utilized with the fiber communication system depicted in FIG. 1.

FIG. 5 is a schematic illustration depicting an alternative downstream transmitter 500 that can be utilized with fiber communication system 100, depicted in FIG. 1. Downstream transmitter 500 is similar to downstream transmitter 300 (FIG. 3), including the implementation of direct modulation and polarization division multiplexing, except that downstream transmitter 500 further implements quadrature amplitude modulation (QAM) to modulate the Ch1 signal into downstream modulated data stream 172 (Ch1). That is, further external modulating elements may be utilized per polarization branch (FIG. 2, above) to generate QAM signals.

Downstream transmitter 500 includes downstream optical circulator 136 (see FIG. 1, above) in two-way communication with a laser injected modulator 502, which includes a PBS/PBC 504, which can be a single device or two separate devices. Additionally, all of the components of laser injected modulator 502 may themselves be separate devices, or alternatively all contained within a single photonic chip. Laser injected modulator 502 further includes a first laser diode 506 configured to receive first data 508 from an external data source (not shown in FIG. 5), a second laser diode 510 configured to receive second data 512 from the same, or different, external data source, a third laser diode 514 configured to receive third data 516 from the same/different, external data source, and a fourth laser diode 518 configured to receive fourth data 520 from the same/different external data source.

In operation, downstream transmitter 500 implements dual-polarization from the splitter portion of PBS/PBC 504, which splits first unmodulated signal 168 (Ch1) into its x-polarization component (P1) and y-polarization component (P2). Each polarization component P1, P2 is then input to first non-polarized optical splitter/combiner 522 and second non-polarized optical splitter/combiner 524, respectively. First and second optical splitters/combiners 522, 524 each then further split their respective polarization components P1, P2 into their I-signals 526, 528, respectively, and also into their Q-signals 530, 532, respectively. Generated I-signals 526, 528 then directly excite laser diodes 506, 514, respectively. Before directly communicating with laser diodes 510, 518, respectively, generated Q-signals 530, 532 first pass through first and second quadrature phase shift elements 534, 536, respectively, each of which shifts the Q-signal by 45 degrees in each direction, such that the respective Q-signal is offset by 90 degrees from its respective I-signal when recombined at splitters/combiners 522, 524.

The resultant modulated Ch1 signal, with adhered data, is output from downstream optical circulator 136 of downstream transmitter 500 as downstream modulated data stream 172 (Ch1), and as a polarized, multiplexed QAM signal. According to this exemplary embodiment, utilization of a photonic integrated circuit allows for directly modulated polarization of a multiplexed coherent system, but utilizing significantly lower cost hardware configurations than are realized by conventional architectures. In an exemplary embodiment, laser diodes 506, 510, 514, 516 are PAM-4 modulated laser diodes capable of generating 16-QAM polarization multiplexed signals.

Figure 6:
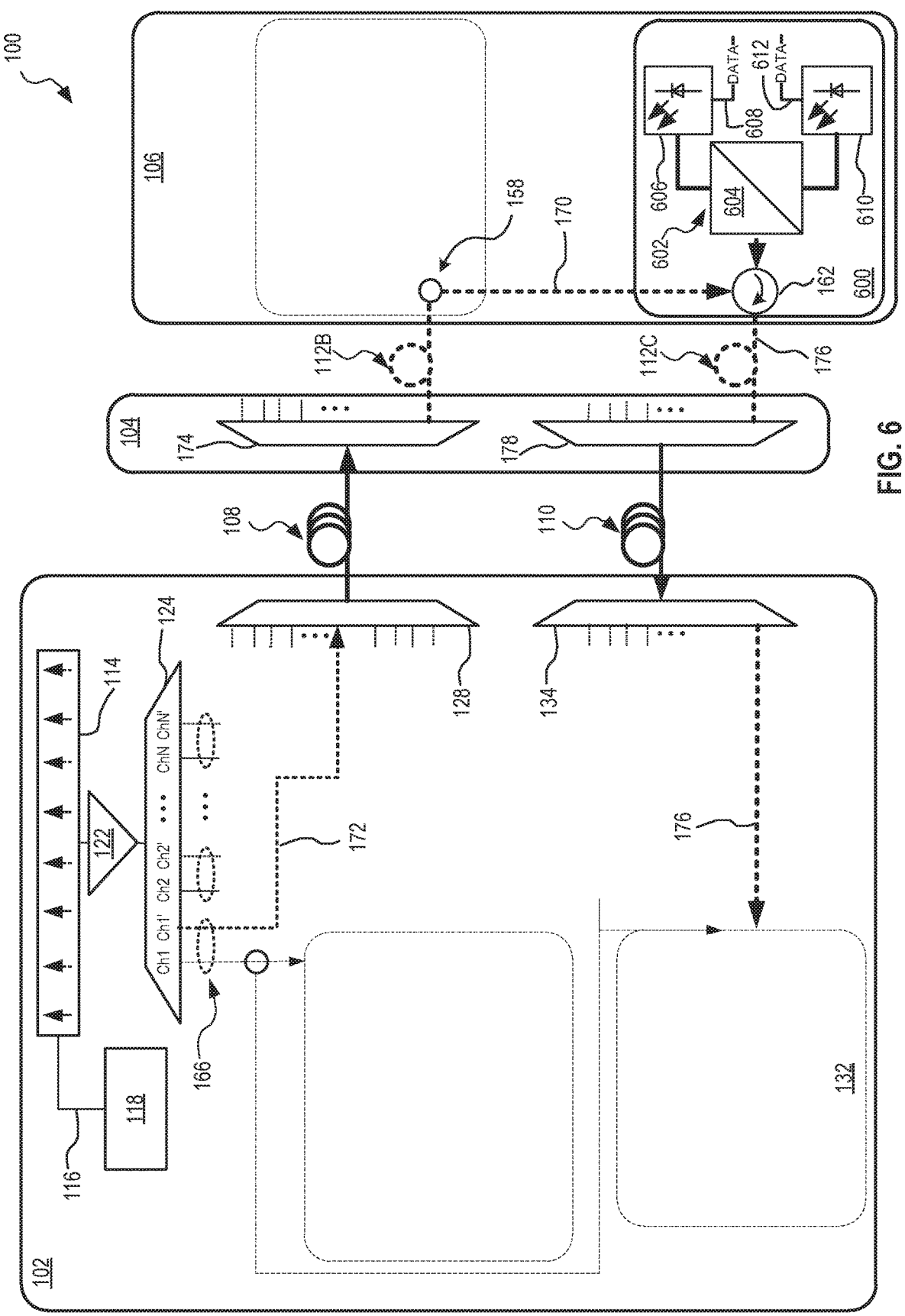
FIG. 6 is a schematic illustration depicting an exemplary upstream connection that can be utilized with the fiber communication system depicted in FIG. 1.

FIG. 6 is a schematic illustration depicting an exemplary upstream transmitter 600 that can be utilized with the fiber communication system 100, depicted in FIG. 1. In the embodiment illustrated in FIG. 6, upstream transmitter 600 is similar to downstream transmitter 300 (FIG. 3) in structure and function. Specifically, upstream transmitter 600 includes upstream optical circulator 162 (see FIG. 1, above) in two-way communication with a laser injected modulator 602 (not separately illustrated in FIG. 6), which includes a PBS/PBC 604, which can be a single device or separate devices. Laser injected modulator 602 further includes a first laser diode 606 configured to receive first data 608 from an external data source (not shown in FIG. 6), and a second laser diode 610 configured to receive second data 612 from the same, or different, external data source. Similar to the embodiments of FIGS. 2-5, above, downstream transmitter 600 may also eliminate for upstream optical circulator 162 by the utilization of at least two separate fiber receivers (not shown).

Upstream transmitter 600 is thus nearly identical to downstream transmitter 300 (FIG. 3), except that upstream transmitter 600 utilizes second unmodulated signal 170 (Ch1') as the end user seed source, in laser injected modulator 602, to combine or adhere with data (e.g., first data 608, second data 612) to generate upstream modulated data stream 176 (Ch1') to carry upstream data signals to an upstream receiver (e.g., upstream receiver 132). In operation, first laser diode 606 and second laser diode 610 also function as slave lasers by injection locking to the master signal from external laser 118. That is, symmetric or asymmetric data for Ch1' (e.g., first data 608, second data 612) is modulated onto the two slave lasers (i.e., first laser diode 606 and second laser diode 610) with polarization multiplexing, much the same as the process implemented with respect to downstream transmitter 300 (FIG. 3) in optical hub 102.

In this example, upstream transmitter 600 is illustrated to substantially mimic the architecture of downstream transmitter 300 (FIG. 3). Alternatively, upstream transmitter 600 could equivalently mimic the architecture of one or more of downstream transmitters 200 (FIG. 2), 400 (FIG. 4), or 500 (FIG. 5) without departing from the scope of the present disclosure. Furthermore, upstream transmitter 600 can conform to any of the embodiments disclosed by FIGS. 2-5, irrespective of the specific architecture of the particular downstream transmitter utilized within optical hub 102. By utilization of high-quality, narrow bandwidth, low noise external laser source 118, the master/slave laser relationship carries through the entirety of system 100, and the plurality of end users 106 that receive modulated/unmodulated signal pairs (which may be 32, 64, 128, or as many as 256 from a single fiber line pair, e.g., downstream fiber 108 and upstream fiber 110).

The significant cost savings according to the present embodiments are thus best realized when considering that as many as 512 downstream transmitters (e.g., downstream transmitter 126, FIG. 1) and upstream transmitters (e.g., upstream transmitter 160, FIG. 1) may be necessary to fully implement all available chattel pairs from a single optical hub 102. The present embodiments implement a significantly lower cost and less complex hardware architecture to utilize the benefits accruing from implementation of high-quality external laser 118, without having to add expensive single longitudinal mode laser diodes, or other compensation hardware necessary to suppress adjacent longitudinal modes from inexpensive lasers or the noise components produced thereby.

Figure 7:
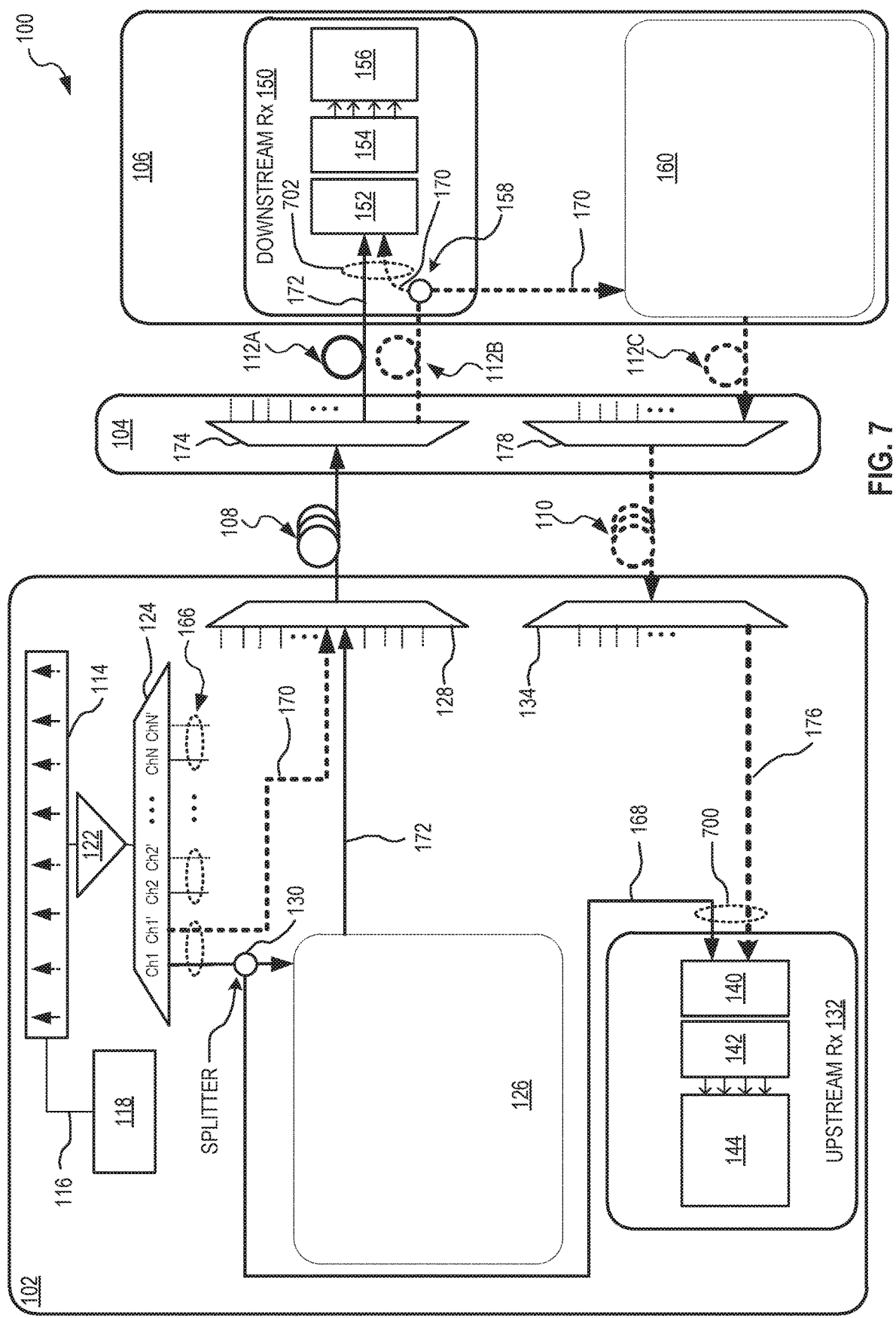
FIG. 7 is a schematic illustration depicting an exemplary processing architecture implemented with the fiber communication system depicted in FIG. 1.

FIG. 7 is a schematic illustration depicting an exemplary processing architecture which can be implemented for upstream receiver 132, downstream receiver 150, and fiber communication system 100, depicted in FIG. 1. The respective architectures of upstream receiver 132 and downstream receiver 150 are similar with respect to form and function (described above with respect to FIG. 1), except that upstream receiver 132 receives a first data stream pair 700 for Ch1, Ch1', in reverse of a second data stream pair 702, which is received by downstream receiver 150. In other words, as described above, first data stream pair 700 includes first unmodulated signal 168 (Ch1) as the LO and upstream modulated data stream 176 (Ch1') to carry data, whereas second data stream pair 702 includes unmodulated signal 170 (Ch1') as the LO and downstream modulated data stream 172 (Ch1) to carry data.

First and second data stream pairs 700, 702 the multiplexed phase synchronized pairs modulated/unmodulated of optical signals that are converted into analog electrical signals by ICR 140 and ICR 152, respectively. The respective analog signals are then converted into digital domain by ADC 142 and ADC 154, for digital signal processing by DSP 144 and DSP 156. In an exemplary embodiment, digital signal processing may be performed by a CMOS ASIC employing very large quantities of gate arrays. A conventional CMOS ASIC, for example, can utilize as many as 70 million gates to process incoming digitized data streams. In the conventional systems, modulated data streams for Ch1 and Ch1' are processed independently, which requires significant resources to estimate frequency offset, drift, and digital down conversion compensation factors (e.g., $e^{-j\omega t}$, where w represents the frequency difference between first unmodulated signal 168 and upstream modulated data stream 176, and w is held constant for coherent tone pair 166, as extended throughout system 100).

According to the exemplary embodiments disclosed herein, on the other hand, the modulated and unmodulated signals from Ch1 and Ch1' are phase synchronized together such that the difference between w of the signal pair is always known, and phase synchronized to maintain a constant relationship. In contrast, conventional systems are required to constantly estimate the carrier phase to compensate for factors such as draft which requires considerable processing resources, as discussed above. According to the present embodiments though, since Ch1 and Ch1' are synchronized together as first and second data stream pairs 700, 702, the offset w between the pairs 700, 702 need not be estimated, since it may be instead easily derived by a simplified subtraction process in DSP 144 and DSP 156 because the signal pairs will drift together by the same amount in a constant relationship. By this advantageous configuration and process, digital signal processing by a CMOS ASIC can be performed utilizing as few as one million gates, thereby greatly improving the processing speed of the respective DSP, and/or reducing the number of physical chips required to perform the processing (or similarly increasing the amount of separate processing that may be performed by the same chip). At present, implementation of the embodiments described herein may improve downstream and upstream data transmission speeds by as much as 5000 times faster than conventional systems.

Figure 8:
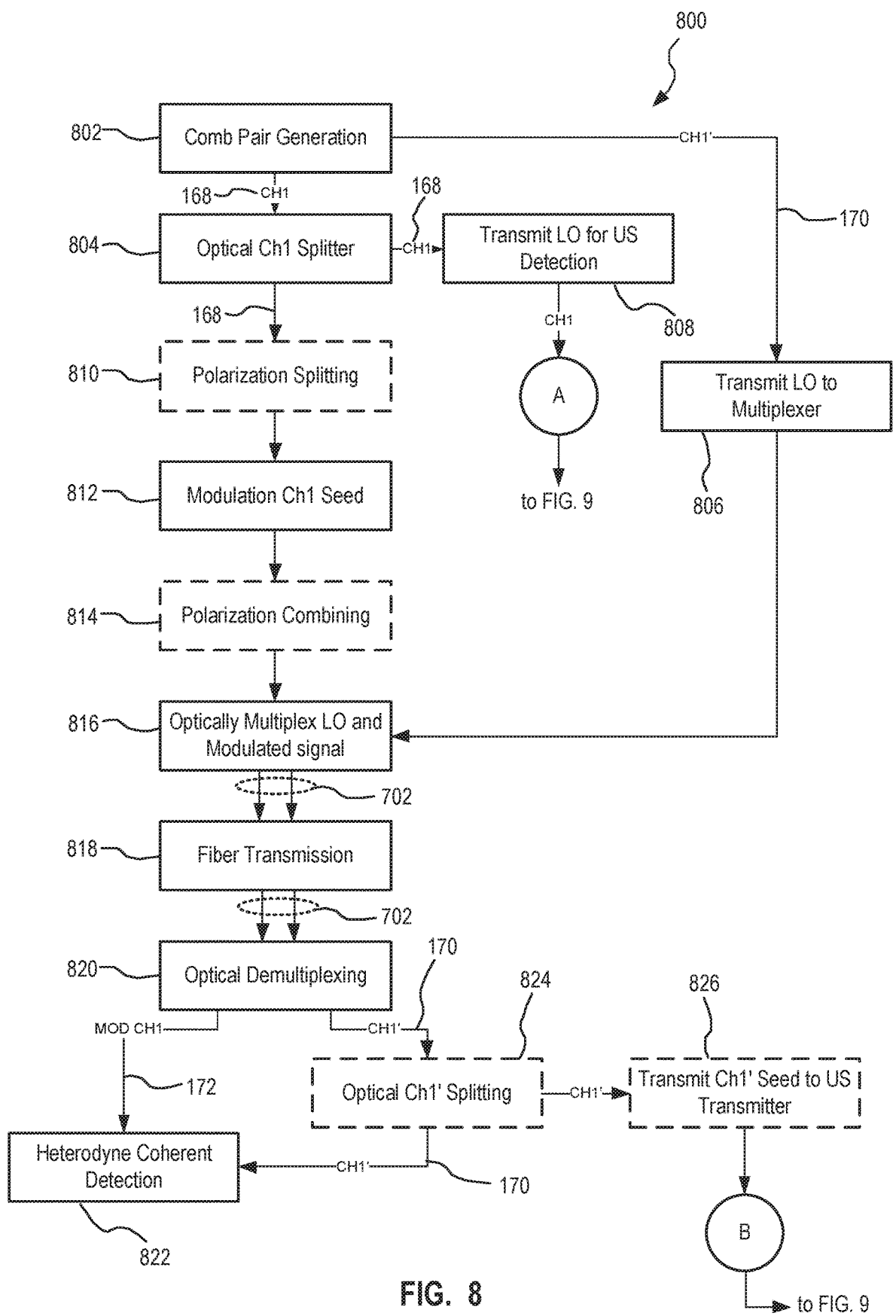
FIG. 8 is a flow chart diagram of an exemplary downstream optical network process.

FIG. 8 is a flow chart diagram of an exemplary downstream optical network process 800 that can be implemented with fiber communication system 100, depicted in FIG. 1. Process 800 begins at step 802. In step 802, coherent tone pairs 166 are generated and output by optical frequency comb generator 114, amplifier 122, and first hub optical demultiplexer 124. Similar to the discussion above, for simplification purposes, the following discussion addresses specific coherent tone pair 166(1) for Ch1, Ch1'. Coherent tone pair 166 includes first unmodulated signal 168 (Ch1) and second unmodulated signal 170 (Ch1'). Once coherent tone pair 166 is generated, process 800 proceeds from step 802 to steps 804 and 806, which may be performed together or simultaneously.

In step 804, first unmodulated signal 168 (Ch1) is input to an optical splitter, e.g., optical splitter 130, FIG. 1. In step 806, second unmodulated signal 170 (Ch1') is transmitted to a multiplexer, e.g., hub optical multiplexer 128, FIG. 1. Referring back to step 804, first unmodulated signal 168 (Ch1) is split to function both as an LO for upstream detection, and as a seed for downstream data transmission. For upstream detection, step 804 proceeds to step 808, where first unmodulated signal 168 (Ch1) is received by an upstream receiver, i.e., upstream receiver 132, FIG. 1. For downstream data transmission, step 804 separately and simultaneously proceeds to step 810.

Step 810 is an optional step, where polarization division multiplexing is desired. In step 810, first unmodulated signal 168 (Ch1) is split into its x-component and y-component parts P1, P2, respectively (e.g., by PBS/PBC 304, FIG. 3 or PBS/PBC 504, FIG. 5) for separate direct or external modulation. Where polarization division multiplexing is not utilized, process 800 skips step 810, and instead proceeds directly from step 804 to step 812. In step 812, first unmodulated signal 168 (Ch1), or its polarized components if optional step 810 is implemented, is modulated by direct (e.g., FIGS. 2, 3, 5) or external (e.g., FIG. 4) modulation. Process 800 then proceeds from step 812 to step 814. Step 814 is an optional step, which is implemented if optional step 810 is also implemented for polarization division multiplexing. In step 814, the x-component and y-component parts P1, P2 are recombined (e.g., by PBS/PBC 304, FIG. 3 or PBS/PBC 504, FIG. 5) for output as downstream modulated data stream 172 (Ch1). Where polarization division multiplexing was not utilized, process 800 skips step 814, and instead proceeds directly from step 812 to step 816.

In step 816, second unmodulated signal 170 (Ch1') and downstream modulated data stream 172 (Ch1) are optically multiplexed, i.e., by hub optical multiplexer 128, FIG. 1, as a phase synchronized data stream pair (e.g., second data stream pair 702, FIG. 7). Process 800 then proceeds from step 816 to step 818, where the phase synchronized data stream pair is transmitted over an optical fiber, i.e., downstream fiber 108, FIG. 1. Process 800 then proceeds from step 818 to step 820, where the synchronized data stream pair is optically demultiplexed, e.g., by node optical demultiplexer 174 in fiber node 104. Process 800 then proceeds from step 820 to step 822, where both components of the demultiplexed data stream pair (e.g., second unmodulated signal 170 (Ch1') and downstream modulated data stream 172 (Ch1)) are received by a downstream receiver (e.g., downstream receiver 150, FIG. 1) for heterodyne coherent detection.

Where an end user (e.g., end user 106) further includes upstream transmission capability, process 800 further includes optional steps 824 and 826. In step 824, and prior to downstream reception in step 822, second unmodulated signal 170 (Ch1') is optically split (e.g., by end user optical splitter 158, FIG. 1), and additionally transmitted, in step 826, to an upstream transmitter of the end user (e.g., upstream transmitter 160, FIG. 1) as a seed signal for a modulator (e.g., modulator 164, FIG. 1) for upstream data transmission, as explained further below with respect to FIG. 9.

Figure 9:
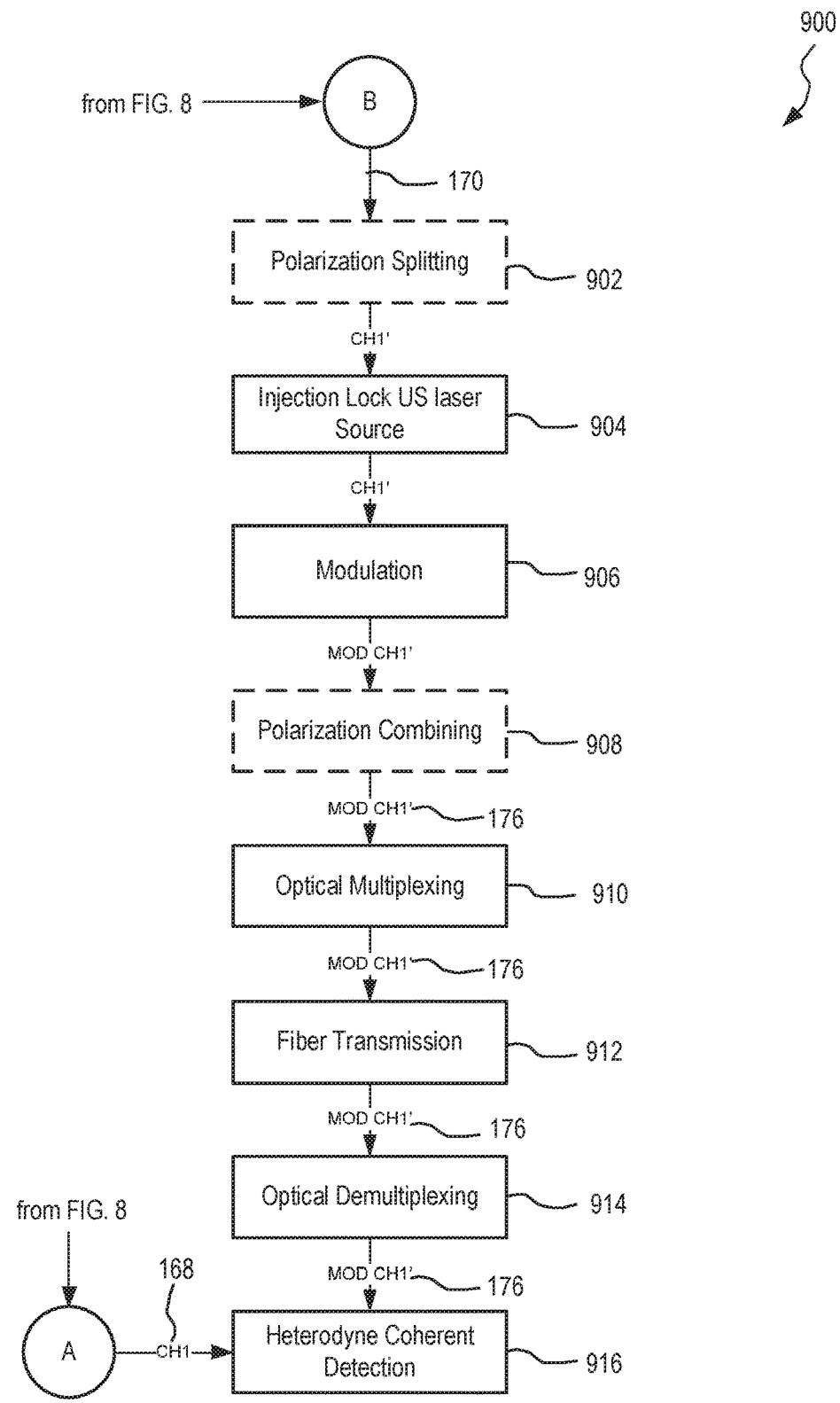
FIG. 9 is a flow chart diagram of an exemplary upstream optical network process that can be implemented with the downstream process depicted in FIG. 8.

FIG. 9 is a flow chart diagram of an exemplary upstream optical network process 900 that can be optionally implemented with fiber communication system 100, depicted in FIG. 1. Process 900 begins at optional step 902. In step 902, where polarization division multiplexing is utilized in the upstream transmitter (e.g., upstream transmitter 160, FIG. 1), second unmodulated signal 170 (Ch1') (from step 826, FIG. 8) is split into its x-component and y-component parts (e.g., by PBS/PBC 604, FIG. 6) for separate direct or external modulation. Where polarization division multiplexing is not utilized, step 902 is skipped, and process 900 instead begins at step 904.

In step 904, second unmodulated signal 170 (Ch1'), or its polarized components if optional step 902 is implemented, is injection locked to the master source laser (e.g., external laser 118, FIG. 1), as described above with respect to FIGS. 1 and 6. Step 904 then proceeds to step 906, where injection locked signal is modulated by direct or external modulation. Process 900 then proceeds from step 906 to step 908. Step 908 is an optional step, which is implemented if optional step 902 is also implemented for polarization division multiplexing. In step 908, the x-component and y-component parts of the excited Ch1' signal are recombined (e.g., by PBS/PBC 604, FIG. 6) for output as upstream modulated data stream 176 (Ch1'). Where polarization division multiplexing was not utilized, process 900 skips step 908, and instead proceeds directly from step 906 to step 910.

In step 910, upstream modulated data stream 176 (Ch1') is optically multiplexed, i.e., by node optical multiplexer 178, FIG. 1, with other upstream data stream signals (not shown). Process 900 then proceeds from step 910 to step 912, where upstream modulated data stream 176 (Ch1') is transmitted over an optical fiber, i.e., upstream fiber 110, FIG. 1. Process 900 then proceeds from step 912 to step 914, where upstream modulated data stream 176 (Ch1') is optically demultiplexed, e.g., by second hub optical demultiplexer 134, which separates the selected data stream from the other upstream data stream signals, for transmission to a particular upstream receiver tuned to receive the modulated data stream. Process 900 then proceeds from step 914 to step 916, where both components (e.g., first unmodulated signal 168 (Ch1), FIG. 8, and upstream modulated data stream 176 (Ch1')) of the upstream data stream pair, e.g., first data stream pair 700, FIG. 7, are received by an upstream receiver (e.g., upstream receiver and 32, FIG. 1) for heterodyne coherent detection.

As illustrated in the exemplary embodiment, a difference between upstream and downstream signal transmission is that an entire synchronized modulated/unmodulated channel pair (e.g., second data stream pair 702, FIG. 7) can be transmitted in the downstream direction, whereas, in the upstream direction, only a data modulated signal (e.g., upstream modulated data stream 176 (Ch1')) to be transmitted over the upstream fiber connection, i.e., upstream fiber 110. An advantage of the present configuration is that the LO for upstream coherent detection (e.g., at upstream receiver 132, FIG. 1) comes directly from the split signal, i.e., first unmodulated signal 168 (Ch1) generated from optical frequency comb generator 114 within optical hub 102, after separation by first hub optical demultiplexer 124, as depicted in FIG. 1. Conventional systems typically require LO generation at each stage of the respective system. According to the present disclosure, on the other hand, relatively inexpensive slave lasers can be implemented throughout the system architecture for modulation and polarization multiplexing in both optical hub 102 and end user 106 components, without requiring an additional LO source at the end user.

According to the present disclosure, utilization of dual-polarization optical transmitters, and by direct modulation of semiconductor lasers with coherent detection, is particularly beneficial for not only longhaul applications, but also for shortreach applications to reduce the cost of electronic hardware, while also rendering the overall network system architecture more compact. The present systems and methods further solve the conventional problem of synchronizing two laser sources over a long period of time. Utilization of the phase synchronized data stream pairs and slave lasers herein allows continual synchronization of the various laser sources throughout the system during its entire operation. These solutions can be implemented within coherent DWDM-PON system architectures for access networks in a cost-efficient manner.

Utilization of the high quality optical comb source at the front end of the system thus further allows a plurality of simultaneous narrow bandwidth wavelength channels to be generated with easily controlled spacing, and therefore also simplified tuning of the entire wavelength comb. This centralized comb light source in the optical hub provides master seeding sources and LO signals that can be reused throughout the system, and for both downstream and upstream transmission. The implementation of optical injection, as described herein, further improves the performance of low-cost multi-longitudinal slave laser sources in terms of spectral bandwidth and noise properties. Access networks according to the present systems and methods thus achieve more efficient transmission of wavelengths through optical fibers, thereby increasing the capacity of transmitted data, but at lower power, increased sensitivity, lower hardware cost, and a reduction in dispersion, DSP compensation, and error correction.

Exemplary embodiments of fiber communication systems and methods are described above in detail. The systems and methods of this disclosure though, are not limited to only the specific embodiments described herein, but rather, the components and/or steps of their implementation may be utilized independently and separately from other components and/or steps described herein. Additionally, the exemplary embodiments can be implemented and utilized in connection with other access networks utilizing fiber and coaxial transmission at the end user stage.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Although specific features of various embodiments of the disclosure may be shown in some drawings and not in others, this is for convenience only. In accordance with the principles of the disclosure, a particular feature shown in a drawing may be referenced and/or claimed in combination with features of the other drawings. For example, the following list of example claims represents only some of the potential combinations of elements possible from the systems and methods described herein.

a(i). An injection locked transmitter for an optical communication network, comprising: a master seed laser source input substantially confined to a single longitudinal mode; an input data stream; and a laser injected modulator including at least one slave laser having a resonator frequency being injection locked to a frequency of the single longitudinal mode of the master seed laser source, wherein the laser injected modulator is configured to receive the master seed laser source input and the input data stream, and output a laser modulated data stream.

b(i). The transmitter of claim a(i), wherein the laser injected modulator is configured to implement direct modulation.

c(i). The transmitter of claim a(i), wherein the laser injected modulator is configured to implement external modulation.

d(i). The transmitter of claim a(i), wherein the at least one slave laser comprises at least one of an LED, a Fabry Perot laser diode, and a vertical-cavity surface-emitting laser.

e(i). The transmitter of claim a(i), further comprising a first optical circulator in communication with the laser injected modulator and the master seed laser source input.

f(i). The transmitter of claim e(i), wherein the laser injected modulator is configured to implement one of polarization division multiplexing, space division multiplexing, and mode division multiplexing.

g(i). The transmitter of claim f(i), wherein the laser injected modulator is configured to multiplex the master seed laser source input at one of a 90 degree polarization, a 60 degree polarization, a 90 degree polarization, a spiral polarization, a circular polarization, a vortex polarization, or an orbital angular momentum.

h(i). The transmitter of claim f(i), further comprising a polarization beam splitter and a polarization beam combiner disposed between the first optical circulator and the at least one slave laser.

i(i). The transmitter of claim h(i), wherein the at least one slave laser comprises a first laser diode and a second laser diode, wherein the first laser diode is configured to receive an x-component of the master seed laser source input, and wherein the second laser diode is configured to receive a y-component of the master seed laser source input.

j(i). The transmitter of claim i(i), further comprising: a first optical splitter and optical combiner disposed between the polarization beam splitter and the first laser diode; and a second optical splitter and optical combiner disposed between the polarization beam splitter and the second laser diode, wherein the first laser diode comprises a first sub-laser and a second sub-laser, wherein the second laser diode comprises a third sub-laser and a fourth sub-laser, wherein the first sub-laser is configured to receive an I-signal of the x-component, wherein the second sub-laser is configured to receive a Q-signal of the x-component, wherein the third sub-laser is configured to receive an I-signal of the y-component, wherein the fourth sub-laser is configured to receive a Q-signal of the y-component.

k(i). The transmitter of claim j(i), further comprising: a first phase shift element disposed between the first optical splitter and the second sub-laser; and a second phase shift element disposed between the second optical splitter and the fourth sub-laser.

l(i). The transmitter of claim e(i), further comprising: a second optical circulator in one-way communication with the first optical circulator and in two-way communication with the at least one slave laser; and an external modulation element disposed between the first optical circulator and the second optical circulator, wherein the external modulation element is configured to receive the input data stream and an output of the second optical circulator, wherein the first optical circulator is in one-way communication with an output of the external modulation element.

a(ii). An optical network communication system, comprising: an input signal source; an optical frequency comb generator configured to receive the input signal source and output a plurality of phase synchronized coherent tone pairs, each of the plurality of phase synchronized coherent tone pairs including a first unmodulated signal and a second unmodulated signal, a first transmitter configured to receive the first unmodulated signal of a selected one of the plurality of phase synchronized coherent tone pairs as a seed source and to output a first modulated data stream; and a first receiver configured to receive the first modulated data stream from the first transmitter and receive the second unmodulated signal of the selected one of the plurality of phase synchronized coherent tone pairs as a local oscillator source.

b(ii). The system of claim a(ii), wherein the optical frequency comb generator comprises an amplifier and an optical demultiplexer.

c(ii). The system of claim a(ii), wherein the optical frequency comb generator is configured to implement one of a mode-locked laser, a gain-switched laser, and electro-optical modulation.

d(ii). The system of claim a(ii), wherein the selected one of the plurality of phase synchronized coherent tone pairs are controllable at a constant frequency spacing with respect to one another throughout the system.

e(ii). The system of claim a(ii), wherein the system is configured to perform heterodyne detection.

f(ii). The system of claim a(ii), wherein the first transmitter comprises a first laser injected modulator and a first optical circulator.

g(ii). The system of claim a(ii), wherein the first laser injected modulator is configured to implement direct modulation.

h(ii). The system of claim a(ii), wherein the first laser injected modulator is configured to implement external modulation.

i(ii). The system of claim g(ii), wherein the input signal source includes an external master laser.

j(ii). The system of claim i(ii), wherein the first modulator comprises a first laser diode configured to injection lock to the external master laser.

k(ii). The system of claim j(ii), wherein the first laser diode is configured to receive first data from a first external data source to adhere into the output first modulated data stream.

l(ii). The system of claim j(ii), wherein the first modulator further comprises a first polarization beam splitter and a first polarization beam combiner.

m(ii). The system of claim l(ii), wherein the first laser diode comprises first and second slave lasers, wherein the first and second slave lasers are configured to receive first and second polarization components, respectively, from the first polarization beam splitter.

n(ii). The system of claim m(ii), wherein the first modulator is configured to implement quadrature amplitude modulation.

o(ii). The system of claim n(ii), wherein the first slave laser comprises a first sub-laser and a second sub-laser, wherein the second slave laser comprises a third sub-laser and a fourth sub-laser, wherein the first and second sub-lasers are configured to receive an I-signal and a Q-signal of the first polarization component, respectively, and wherein the third and fourth sub-lasers are configured to receive an I-signal and a Q-signal of the second polarization component, respectively.

p(ii). The system of claim a(ii), further comprising a second transmitter configured to receive the second unmodulated signal of the selected one of the plurality of phase synchronized coherent tone pairs as a seed source and to output a second modulated data stream.

q(ii). The system of claim p(ii), wherein the second transmitter is configured to implement one of direct and external modulation.

r(ii). The system of claim p(ii), wherein the second transmitter is configured to implement one or more of polarization division multiplexing and quadrature amplitude modulation.

s(ii). The system of claim p(ii), further comprising a second receiver configured to receive the second modulated data stream from the second transmitter and receive the first unmodulated signal of the selected one of the plurality of phase synchronized coherent tone pairs as a local oscillator source.

a(iii). An optical network communication system, comprising: an optical hub including an optical frequency comb generator configured to output at least one phase synchronized coherent tone pair having a first unmodulated signal and a second unmodulated signal, and a downstream transmitter configured to receive the first unmodulated signal as a seed source and to output a downstream modulated data stream; a fiber node; and an end user including a downstream receiver configured to receive the downstream modulated data stream from the downstream transmitter and receive the second unmodulated signal as a local oscillator source.

b(iii). The system of claim a(iii), wherein the selected one of the plurality of phase synchronized coherent tone pairs are controllable at a constant frequency spacing with respect to one another throughout the system.

c(iii). The system of claim a(iii), wherein the optical hub further comprises an amplifier, a first hub optical demultiplexer, and a hub optical multiplexer.

d(iii). The system of claim c(iii), wherein the fiber node comprises a node optical demultiplexer configured to demultiplex an output from the hub optical multiplexer.

e(iii). The system of claim d(iii), wherein the hub optical multiplexer is configured to communicate with the node optical demultiplexer by way of a downstream fiber.

f(iii). The system of claim d(iii), wherein the node optical demultiplexer is configured to communicate with the downstream transmitter by way of first fiber optics.

g(iii). The system of claim a(iii), wherein the downstream receiver comprises a downstream integrated coherent receiver, a downstream analog to digital converter, and a downstream digital signal processor.

h(iii). The system of claim f(iii), wherein the end user further comprises an upstream transmitter, wherein the fiber node further comprises a node optical multiplexer, and wherein the optical hub further comprises a second hub optical demultiplexer and an upstream receiver.

i(iii). The system of claim h(iii), wherein the upstream transmitter is configured to communicate with the node optical multiplexer by way of second fiber optics, and wherein the node optical multiplexer is configured to communicate with the second hub optical demultiplexer by way of an upstream fiber.

j(iii). The system of claim i(iii), wherein the upstream transmitter is configured to receive the second unmodulated signal as a seed source and to output a upstream modulated data stream to the node optical multiplexer.

k(iii). The system of claim i(iii), wherein the upstream receiver comprises an upstream integrated coherent receiver, an upstream analog to digital converter, and an upstream digital signal processor.

l(iii). The system of claim i(iii), wherein the upstream receiver is configured to receive as a data source the upstream modulated data stream from the node optical multiplexer, and to receive from the first hub optical demultiplexer the first unmodulated signal as a local oscillator source.

m(iii). The system of claim a(iii), wherein the at least one phase synchronized coherent tone pair is controllable at a constant frequency spacing with respect to one another throughout the system.

n(iii). The system of claim a(iii), wherein the end user comprises at least one of a customer device, customer premises, a business user, and an optical network unit.

o(iii). The system of claim a(iii), further configured to implement coherent dense wavelength division multiplexing passive optical network architecture.

p(iii). The system of claim i(iii), wherein the downstream digital signal processor is configured to hold constant the difference in frequency separation w between the second unmodulated signal and the downstream modulated data stream when calculating a digital down conversion compensation factor $e^{\hat{}}-j\omega t$.

q(iii). The system of claim k(iii), wherein the upstream digital signal processor is configured to hold constant the difference in frequency separation w between the first unmodulated signal and the upstream modulated data stream when calculating the digital down conversion compensation factor $e^{\hat{}}-j\omega t$.

a(iv). A method of optical network processing, comprising the steps of: generating at least one pair of first and second unmodulated phase synchronized coherent tones; transmitting the first unmodulated phase synchronized coherent tone to a first transmitter as a seed signal; adhering downstream data, in the first transmitter, to the first unmodulated phase synchronized coherent tone to generate a first modulated data stream signal; optically multiplexing the first modulated data stream signal and the second unmodulated phase synchronized coherent tone together within a hub optical multiplexer; and communicating the multiplexed first modulated data stream signal and the second unmodulated phase synchronized coherent tone to a first receiver, by way of fiber optics, for downstream heterodyne detection.

b(iv). The method of claim a(iv), further comprising, prior to the step of adhering downstream data, the step of polarization beam splitting the first unmodulated phase synchronized coherent tone.

c(iv). The method of claim b(iv), further comprising, after the step of adhering downstream data, and prior to the step of optically multiplexing, the step of polarization beam combining split components from the step of polarization beam splitting of the first unmodulated phase synchronized coherent tone.

d(iv). The method of claim a(iv), wherein the step of adhering downstream data implements injection locking.

e(iv). The method of claim a(iv), further comprising the steps of: optically splitting, prior to the step of communicating, the second unmodulated phase synchronized coherent tone; and receiving, by a second transmitter, a portion of the optically split second unmodulated phase synchronized coherent tone as local oscillator for upstream detection.

f(iv). The method of claim e(iv), further comprising a step of adhering upstream data, in the second transmitter, to the second unmodulated phase synchronized coherent tone to generate a second modulated data stream signal.

g(iv). The method of claim f(iv), wherein the step of adhering upstream data comprises a step of injection locking a slave laser to an external master laser.

h(iv). The method of claim f(iv), further comprising, prior to the step of adhering upstream data, the step of polarization beam splitting the second unmodulated phase synchronized coherent tone.

i(iv). The method of claim h(iv), further comprising, after the step of adhering upstream data, the step of polarization beam combining split components from the step of polarization beam splitting of the second unmodulated phase synchronized coherent tone.

j(iv). The method of claim f(iv), further comprising a step of transmitting the second modulated data stream signal to a second receiver, by way of fiber optics, for upstream heterodyne detection.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a DSP device, and/or any other circuit or processor capable of executing the functions described herein. The processes described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term "processor."

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An injection locked transmitter for an optical communication network, comprising:
    an input portion configured to receive an input data stream including a phase synchronized coherent tone pair from a remote primary laser source of the optical communication network, the phase synchronized coherent tone pair having (i) a first coherent tone containing a downstream modulated data stream, and (ii) a second coherent tone containing a downstream unmodulated signal; and
    a laser injected modulator including a first secondary laser having a resonator frequency injection locked to a primary frequency of a single longitudinal mode of the remote primary laser source,
    wherein the laser injected modulator is configured to receive the downstream unmodulated signal on the second coherent tone, and output an upstream laser modulated data stream.

2. The transmitter of claim 1, wherein the laser injected modulator is configured to implement direct modulation.

3. The transmitter of claim 1, wherein the laser injected modulator is configured to implement external modulation.

4. The transmitter of claim 1, wherein the at least one slave laser comprises at least one of an LED, a Fabry Perot laser diode, and a vertical-cavity surface-emitting laser.

5. The transmitter of claim 1, further comprising a first optical circulator in communication with the laser injected modulator and the unmodulated signal on the second coherent tone.

6. The transmitter of claim 5, further comprising a polarization beam combiner (PBC) disposed between the first optical circulator and the at least one slave laser.

7. The transmitter of claim 6, wherein the laser injected modulator is configured to implement one of polarization division multiplexing, space division multiplexing, and mode division multiplexing.

8. The transmitter of claim 7, wherein the laser injected modulator is configured to multiplex the master seed laser source input at one of a 90 degree polarization, a 60 degree polarization, a 90 degree polarization, a spiral polarization, a circular polarization, a vortex polarization, or an orbital angular momentum.

9. The transmitter of claim 6, further comprising a second secondary laser, wherein the first secondary laser is configured to modulate an x-component of the upstream laser modulated data stream, and wherein the second secondary laser is configured to modulate a y-component of the upstream laser modulated data stream.

10. The system of claim 9, wherein the laser injected modulator is configured to implement quadrature amplitude modulation.

11. The transmitter of claim 10, further comprising:
    a first optical splitter disposed between the PBC and the first secondary laser; and
    a second optical splitter disposed between the PBC and the second secondary laser,
    wherein the first secondary laser comprises a first sub-laser and a second sub-laser,
    wherein the second secondary laser comprises a third sub-laser and a fourth sub-laser,
    wherein the first sub-laser is configured to receive an I-signal of the x-component,
    wherein the second sub-laser is configured to receive a Q-signal of the x-component,
    wherein the third sub-laser is configured to receive an I-signal of the y-component,
    wherein the fourth sub-laser is configured to receive a Q-signal of the y-component.

12. The transmitter of claim 11, further comprising:
    a first phase shift element disposed between the first optical splitter and the second sub-laser; and a second phase shift element disposed between the second optical splitter and the fourth sub-laser.

13. The transmitter of claim 5, further comprising:
a downstream receiver configured to process the downstream modulated data stream on the first coherent tone; and
a second optical circulator in one-way communication with the first optical circulator and in two-way communication with the downstream receiver.

14. The transmitter of claim 13, wherein the downstream receiver is a coherent receiver and is further configured to receive the unmodulated signal on the second coherent tone as a local oscillator source.

15. The system of claim 13, wherein the downstream receiver comprises one or more of an integrated coherent receiver, an analog to digital converter, and a digital signal processor.

16. The system of claim 13, wherein the downstream receiver is further configured to perform heterodyne detection.

17. The transmitter of claim 1, comprising a downstream termination unit.

18. The transmitter of claim 17, wherein the downstream termination unit comprises at least one of a transceiver, a customer device, a customer premises equipment, a modem, an optical network unit (ONU), and a virtualized cable modem termination system (vCMTS).

19. The transmitter of claim 1, wherein the first coherent tone is substantially confined to a single narrow bandwidth longitudinal mode of the remote primary laser source.

20. The transmitter of claim 1, wherein the first secondary laser is configured to receive data from a first external data source to adhere into the output upstream laser modulated data stream.

* * * * *